United States Patent
Chauvin et al.

(10) Patent No.: US 8,151,308 B1
(45) Date of Patent: Apr. 3, 2012

(54) MODIFYING THE BEHAVIOR OF A MULTIMEDIA TRANSPORT SYSTEM IN RESPONSE TO DETECTED CAPABILITIES OF A CLIENT SYSTEM

(75) Inventors: Joe Chauvin, Sammamish, WA (US); Michael E. Pietraszak, Redmond, WA (US); John D. Canning, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/034,598

(22) Filed: Dec. 28, 2001

(51) Int. Cl.
*H04N 7/173* (2011.01)

(52) U.S. Cl. ............. 725/88; 725/93; 725/102; 709/219

(58) Field of Classification Search .................. 725/2, 4, 725/86–104, 114–116, 138, 144–146; 709/217–231
See application file for complete search history.

(56) References Cited

U.S. PATENT DOCUMENTS

| | | | | |
|---|---|---|---|---|
| 5,721,815 | A * | 2/1998 | Ottesen et al. | 715/721 |
| 5,831,662 | A * | 11/1998 | Payton | 725/122 |
| 5,956,716 | A * | 9/1999 | Kenner et al. | 1/1 |
| 6,002,720 | A * | 12/1999 | Yurt et al. | 375/240 |
| 6,020,912 | A * | 2/2000 | De Lang | 725/91 |
| 6,513,069 | B1 * | 1/2003 | Abato et al. | 709/238 |
| 6,608,966 | B1 * | 8/2003 | Anderson et al. | 386/346 |
| 6,609,253 | B1 * | 8/2003 | Swix et al. | 725/88 |
| 6,701,528 | B1 * | 3/2004 | Arsenault et al. | 725/89 |
| 6,751,802 | B1 * | 6/2004 | Huizer et al. | 725/90 |
| 6,754,907 | B1 * | 6/2004 | Schumacher et al. | 725/87 |
| 7,155,735 | B1 * | 12/2006 | Ngo et al. | 725/101 |
| 2002/0199185 | A1 * | 12/2002 | Kaminski et al. | 725/25 |
| 2003/0040962 | A1 * | 2/2003 | Lewis | 705/14 |
| 2005/0235323 | A1 * | 10/2005 | Ellis et al. | 725/58 |

OTHER PUBLICATIONS

VVD: VCR Operations for Video on Demand, R.T. Rao and C.B. Owen, Proceedings of the SPIE—The International Society for Optical Engineering. Publ by SPIE-Int. Soc. Opt. Eng., USA, vol. 3845, pp. 192-199, 1999.

Live-On-Demand, H. Sakamoto et al., Publ by NTT, Japan, NTT Review vol. 10, No. 1 p. 60-71, Jan. 1998.

Storage, Retrieval, and Delivery of Video Data in Video-On-Demand Systems: Part 1, Kim Hyoung Joong Kim and D. Ghose, TENCON '97 Brisbane—Australia. Proceedings of IEEE TENCON '97. IEEE Region 10 Annual Conference. Speech and Image Technologies for Computing and Telecommunications (Cat. No. 97CH36162), Publ by IEEE, New York, NY, USA, Part vol. 1 p. 81 vol. 1, 1997.

(Continued)

*Primary Examiner* — Annan Shang
(74) *Attorney, Agent, or Firm* — Workman Nydegger

(57) ABSTRACT

Modifying the behavior of a multimedia transport system in response to a detected capability of a client system. A client system may include the capability to perform portions of a multimedia manipulation function, such as a VCR-like function, by using components solely included in the client system. A client system may also include the capability to simultaneously receive multimedia content in excess of what the client system may essentially simultaneously output. This capability may be used to improve the bandwidth utilization of the multimedia server. This may be a result of components, such as a mass storage device or multiple signal input interfaces, being included in the client system. If a client system includes such capabilities, the underlying executable instructions associated with an input device, such as a remote control or keyboard, may be modified to utilize the detected capability.

23 Claims, 7 Drawing Sheets

OTHER PUBLICATIONS

Providing Unrestricted VCR Functions in Multicast Video-On-Demand Servers, E.L. Abram-Profeta and K.G. Shin, Proceedings. IEEE International Conference on Multimedia Computing and Systems; Publ by IEEE Comput. Soc., Los Almitos, CA, USA, pp. 66-75, 1998.

A Scalable Video-On-Demand Service for the Provision of VCR-Like Functions, H.J. Chen et al., Proceedings of the International Conference on Multimedia Computing and Systems, Publ by IEEE Comput. Soc. Press, Los Alamitos, CA, USA, pp. 65-72, 1995.

* cited by examiner

MODIFYING THE BEHAVIOR OF A MULTIMEDIA TRANSPORT SYSTEM IN RESPONSE TO DETECTED CAPABILITIES OF A CLIENT SYSTEM

BACKGROUND OF THE INVENTION

1. The Field of the Invention

The present invention pertains to the field of transporting multimedia content. More particularly, the present invention relates to systems, methods, and computer program products for modifying the operation of a multimedia transport system in response to capabilities of a client system.

2. Background and Related Art

The number of homes receiving individualized multimedia content has increased substantially in recent years. This is due to a number of factors, including more advanced and easier to use processing systems, greater access to broadband services in the home, and more interactive video services. In addition, technological advances have allowed these functionalities in progressively smaller computing devices.

Conventional multimedia content services include pay per view ("PPV") services, which enable a viewer to order and pay for specific programming. Such programming, traditionally a movie or sporting event, was scheduled for broadcast at a predetermined time to those viewers who paid for the programming. However, PPV had many drawbacks for viewers. For example, PPV programming could only take place at the scheduled times. Also, if a viewer had to step away from the viewing area, there was no way to pause and resume the programming.

To meet the problems associated with conventional PPV, video on demand ("VOD") was developed. As its name implies, VOD allows viewers to access programming "on demand." Thus, the viewer does not need to wait until predetermined times for programming to start as required by PPV. VOD also includes video cassette recorder ("VCR")-like functions such as play, record, fast forward, reverse, and pause. This is beneficial to a viewer as she may navigate the program in order to get a richer viewing experience.

However, current implementations of VOD services have certain problems. Video on demand servers are conventionally programmed to send a stream of multimedia content to a client system at a standard transfer rate even though capabilities of client systems may vary. For instance, current VOD implementations have no functionality to transport multimedia content to client systems at a frame rate faster than the client system may display the multimedia content. This might be beneficial in cases where a client system is identified as including a hard disk or other storage device and may store multimedia content for later playback.

Protocols associated with the transport of multimedia content, such as data in the MPEG-2 format, may be used to perform VCR-like functions. Conventional technologies for performing a VCR-like function may consume video on demand server and network resources. These resources may be consumed even though a client system includes the capability to perform the VCR-like function locally. For example, Digital Storage Media Command and Control ("DSM-CC") and Real Time Streaming Protocol ("RTSP") are two protocols commonly used in the transport of multimedia content in a VOD environment. Typically, when a pause function is executed using either of these protocols, transport of multimedia content from a video on demand server to a client system is stopped. However, the session between the video on demand server and the client system persists. That is, a video on demand server must continue to allocate resources to maintain a session with the client system and associated networks must continue to allocate network bandwidth to the session.

FIG. 1 illustrates an example of how portions of bandwidth resources may remain allocated even though no multimedia content is being transported. Shown in FIG. 1 is the duration of program A and program B. These programs may be different program stream program identifiers ("PIDs") that are one a single transport stream, and may be allocated to different VOD programs for two different users. Portions of bandwidth may remain allocated for transport of program B during the pause. This is the case since allowing other VOD session programs to transmit data on those PIDs would mean the PIDs would not be available when the user unpauses. Even though no multimedia content associated with program B is transported during the pause, program A continues to receive only one-half of the available bandwidth and the other one-half is unused.

One solution to the requirement that network bandwidth remain allocated during a pause, is to terminate a session that has been paused for a predetermined amount of time. This releases video on demand server resources and network bandwidth allocated to a session. Another solution is to not reserve any bandwidth when programming is paused. However, both of these solutions may result in dissatisfaction to a user who pauses a program and returns to discover that the transport of multimedia content was terminated as a result of the pause operation and/or they must wait for more bandwidth to become available. The termination of transport of multimedia content may occur even if an associated client system included the capability to store multimedia content for later viewing.

Therefore, what are desired are systems, methods, and computer program products for modifying the behavior of a multimedia transport system in response to capabilities of a client system.

SUMMARY OF THE INVENTION

The principles of the present invention provide for modifying the behavior of a multimedia transport system to more efficiently utilize available bandwidth in response to functionality included in a client system. Modified behavior may include increasing the rate at which multimedia content sent to a client system when network usage is low and/or bandwidth is otherwise under utilized. Modified behavior may also include continuing to send multimedia content during performance of multimedia manipulation function. Network bandwidth continues to be utilized to transfer multimedia content, even if a client system is not configured to essentially simultaneously output all the received multimedia content. Modified behavior may also include transferring the execution of multimedia manipulation functions from the multimedia transport system to a client system. Multimedia manipulation functions may include VCR-like functions, such as the "pause" command.

When a client system, such as a set-top box, is coupled to a multimedia transport system, multimedia content servers, such as a video on demand server, may determine the processing system's capabilities. For example, a video on demand server may determine that a newly installed set-top box includes a hard drive and is capable of storing incoming VOD data prior to watching it. This may allow better bandwidth utilization by using the client storage system and pausing locally, rather at a Video on Demand ("VOD") server. Additional bandwidth utilization may be gained by using tuners that are capable of receiving multimedia content at an increased rate, or multiple tuners, which may indicate the ability to store data or receive multiple streams of multimedia content at an overall increased rate. This determination of the client support for these features may take place by querying a database of previously entered information or querying the client system directly for its capabilities.

Some client systems may include these buffering capabilities that are active at all times. In this case, determining that a client system has certain capability may suffice. However, other client systems may have included capabilities that are not always active. Even if a client system has a capability, there may be some indication that the capability is active before the behavior of a multimedia transport system is modified. For example, a client system may include a removable hard drive that is not always coupled to the client system. To utilize the hard drive, a multimedia transport system may receive some indication the hard drive is actually coupled to the client system. Other cases where the capabilities may not be active, include not having enough program storage space available to record the program, or having one or more tuners unavailable for use by the recording system. Unavailability of tuners may result when the tuners are in use to view and/or record other programs. Indication of active functionality may include a client system sending a notification to a video on demand server or a video on demand server polling a client system.

If a client system has active storage functionality, otherwise under utilized network bandwidth may be utilized to facilitate transport of multimedia content to a client system. One basic way network bandwidth may be efficiently utilized is to modify a portion of the processing functionality associated with an input device such as a remote control. Remote controls may include the VCR-like multimedia manipulation functions of play, record, slow, fast forward, rewind, and pause. Modifying a portion of the functionality associated with a key included in a remote control may include changing the location where execution of a portion of a multimedia manipulation function occurs. For example, execution of functionality may be transferred from a multimedia transport system to a client system. A multimedia transport system may change the location of execution of a portion of a function, such as a multimedia manipulation function, automatically without user intervention.

Associating keys of a remote control with portions of a function that may be executed at a client system increases the chance of utilizing components included in the client system to facilitate performance of the function. When functions are facilitated by a client system, network messaging is reduced which conserves the resources of associated video on demand servers and associated network systems.

When a multimedia manipulation function is performed at a client system, an associated multimedia transport system may be unaffected by performance of the multimedia manipulation function. Thus, the multimedia transport system may continue to transport multimedia content without interruption. This increases the chances of efficient utilization of network bandwidth and of the resources of the multimedia transport system.

One VCR-like function typically associated with video on demand is the pause function. In response to detecting an event, such as activation of the pause key on a remote control, output of multimedia content at a client system is paused by operations performed solely at the client system. While output is paused, the client system continues to receive multimedia content, as opposed to keeping bandwidth reserved while no multimedia content is being transported. The client system stores the multimedia content received while output is paused. Then, when output of multimedia content is resumed, the stored multimedia content may be sent to an output device.

This method of pausing is advantageous because the multimedia transport system continues to transport multimedia content even though normal output at the client system is disrupted. Thus, there is a reduced chance that bandwidth for transporting multimedia content will remain allocated even though no multimedia content is being transported. This conserves processor resources of associated video on demand servers and network bandwidth.

If a client system has active functionality, even more exotic ways can be provided for otherwise under-utilized network bandwidth to facilitate transport of multimedia content to a client system. For example, if a client system has an active hard drive, a video on demand server may transport multimedia content comprising a movie in the MPEG-2 format at an increased rate. If the increased rate of transfer causes reception of multimedia content in excess of what the client system may essentially simultaneously display, the excess content may be stored to the hard disk and displayed at a later time. A multimedia transport system may expedite transport of multimedia content in this manner to facilitate release of network bandwidth. For example, if a movie was ordered during a period of relatively low network usage, a video on demand server may transport the movie at an increased rate to facilitate completion of delivery before a period of increased network occurs. Sending multimedia content to a client system at a rate greater than the client system may essentially simultaneously output the multimedia content is advantageous. It promotes time-based load balancing, by making more bandwidth available during periods of higher usage. This results in cost efficient use of available bandwidth. It also conserves the resources of associated video on demand servers and associated networks by reducing duration of connections that must be maintained to a client system.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
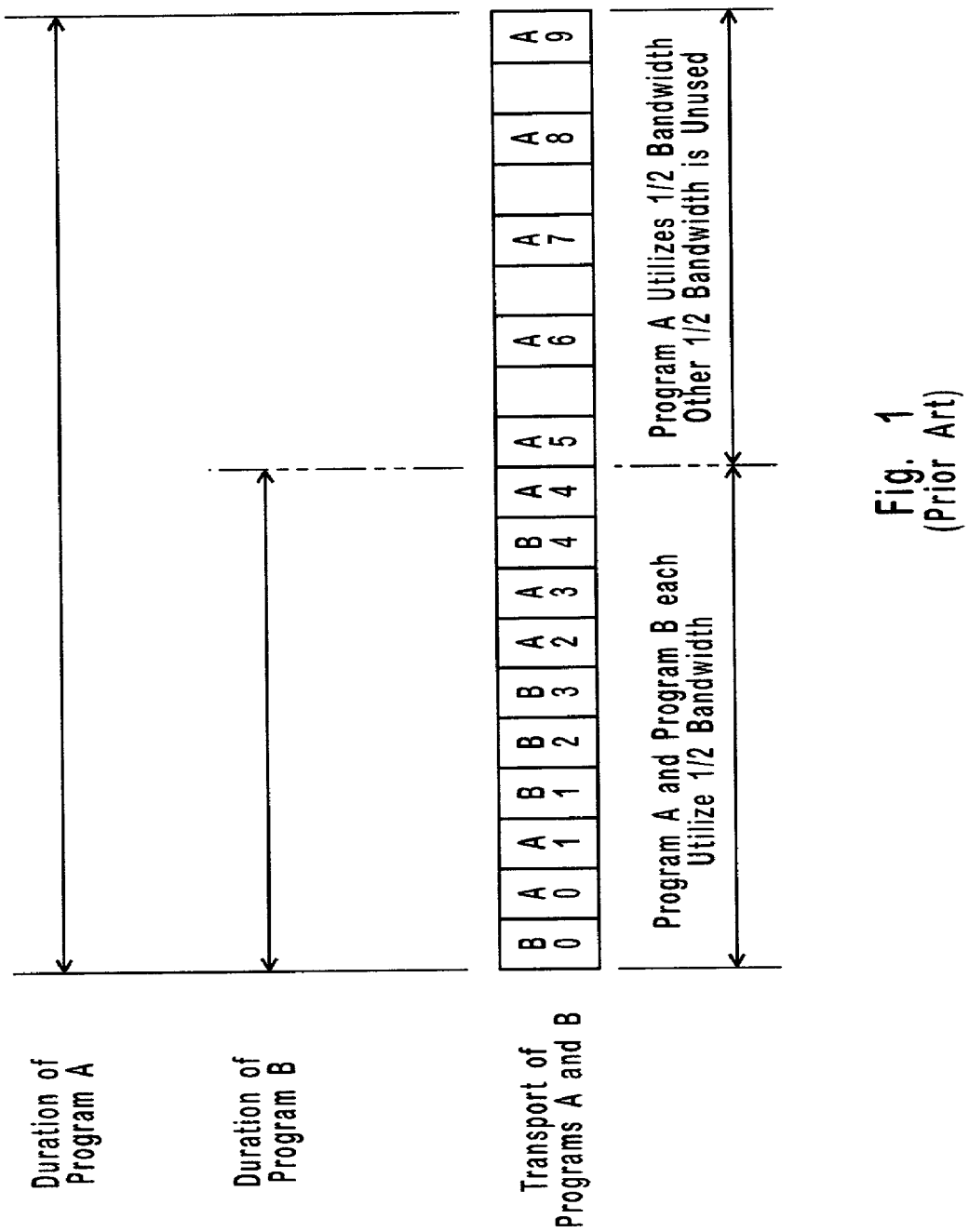
FIG. 1 illustrates an example of a prior art method for allocating bandwidth between two programs.

The present invention extends to systems, methods, and computer program products for modifying the behavior of a multimedia transport system to efficiently utilize network bandwidth. A multimedia transport system, which includes a video on demand server, may become aware that a client system includes certain processing capabilities. These processing capabilities may allow the multimedia transport system to modify its behavior in a way that conserves network bandwidth. In some embodiments, a database of previously stored client system configurations may be accessed to determine the processing capabilities of a client. A multimedia transport system may or may not receive notification of a client system's capabilities.

A multimedia transport system may modify its behavior by sending multimedia content to a client system at a rate greater than the client system may essentially simultaneously output the multimedia content. A client system may include a tuner that is capable of receiving multimedia content at a rate greater than the multimedia content may be essentially simultaneously output at the client system. If the client system is determined to include such a tuner, and also includes the capability to store received multimedia content, a multimedia transport system may send multimedia content (for example, a VOD movie) to the client system at an increased rate to improve transport efficiency.

The amount of additional multimedia content sent to a client system may vary depending on available bandwidth at a given time. If more bandwidth is available, for example, during periods of reduced network bandwidth usage, transferring multimedia content to client systems may take less time. Sending multimedia content in less time, for example, a complete Video-On-Demand ("VOD") movie, more efficiently utilizes available bandwidth and frees up bandwidth sooner for periods of increased network bandwidth usage. This may be especially beneficial in networks that experience changes in the level of network bandwidth usage.

A multimedia transport system may also modify its behavior by increasing the number of streams of multimedia content transported to a client system. This may be done when it is determined that a client system includes multiple tuners. If a client system includes multiple tuners and the capability to store received multimedia content, a multimedia transport system may send multimedia content to multiple tuners simultaneously.

A multimedia transport system may utilize a first tuner to send a first multimedia content stream that will be essentially simultaneously output at the client system. Second or additional tuners may be used to receive multimedia content streams that will be stored at the client system by a digital video recorder ("DVR") or personal video recorder ("PVR"). Thus, multiple tuners may be utilized to facilitate sending multimedia content in less time so as to free up bandwidth sooner for periods of increased network bandwidth usage.

Embodiments of the present invention may also similarly include multiple tuners, but in which one or more of the tuners may be capable of receiving multimedia content at a higher rate than the client system may essentially simultaneously output. For example, a client system may include two tuners, each of which may receive multimedia content at a rate twice as great as the client system may essentially simultaneously output the multimedia content. In this example, a multimedia transport system may send a movie to a client system in one-fourth of the time it would otherwise take.

Increasing the rate of delivery, by sending additional multimedia content to a tuner or utilizing multiple tuners to transport multimedia content. may be a beneficial form of load balancing. It may be performed when usage of associated network systems is low, bandwidth on such network systems is being under utilized, or when (based on existing multimedia transport protocols) network bandwidth would remain allocated but no multimedia content transported.

In some embodiments, non-tuner inputs included in an input interface may receive multimedia content. Multimedia content may be received through a network interface card, a cable modem, a Digital Subscriber Line ("DSL") modem, a standard telephone modem, a satellite receiver, or other device known in the art that may receive data. It may be that a single non-tuner input is used to receive multimedia content at a rate greater than may be simultaneously output. Likewise, a non-tuner input may be configured to operate with one or more tuners or one or more other non-tuner inputs to receive multimedia content at a rate greater than may be simultaneously output. For example, multimedia content may be received at a tuner and a cable modem essentially simultaneously.

In other embodiments, the transport of multimedia content may originate in different locations. When different network locations are capable of transmitting essentially identical multimedia content, such content may be received from the different network locations essentially simultaneously. For example, assume a first multimedia transport system and second multimedia transport system are both capable of transporting essentially identical multimedia content. In this example, the first multimedia transport system and the second multimedia transport system may transport portions of the multimedia content essentially simultaneously to a single client system.

Behavior of a multimedia transport system may also be modified by moving the location of execution of a multimedia manipulation function. Moving the location of execution may occur when a client system includes the capability to perform multimedia manipulation functions locally. One example is a client system performing processing associated with VCR-like functions, which would otherwise be performed at a video on demand server. In particular, the VCR-like "pause" function may be executed completely locally at a client system.

Functions may be remapped in a client system that includes DVR or PVR capabilities. For example, a pause function may be remapped to utilize client side DVR pause functionality instead of server based VOD pause functionality. This allows a multimedia transport system to continue streaming multimedia content, for example, a VOD movie, during performance of a pause function. In this manner, multimedia content may be streamed more efficiently so as to free up bandwidth for periods of increased network bandwidth usage.

Embodiments of the present invention may include continuing to receive multimedia content during the performance of a multimedia manipulation function. This may include a determination that a client system is capable of storing received multimedia content. An example of this is a client system that includes a DVR or PVR. In response to detecting DVR or PVR capabilities, a multimedia transport system may modify its behavior when transporting multimedia content to a client system.

When a multimedia operation is performed, such as playing, rewinding, fast forwarding or pausing a stream of multimedia content, the modified behavior may be executed. For example, during a pause command, the multimedia transport system may continue to transport multimedia content to the client system for storage, even though the output of multimedia content is paused.

Embodiments of the present invention may comprise a special purpose or general purpose computer including various computer hardware components, as discussed in greater detail below. One example of a special purpose computer is the set top box, which may enhance the capabilities of conventional televisions. The embodiments may further comprise multiple computers linked in a networked environment.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium that can be used to carry or store desired program code means in the form of computer-executable instructions or data structures and that can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The invention will be described in the general context of computer-executable instructions, such as program modules, being executed by computers, such as set-top boxes. Generally, program modules include routines, programs, objects, components, data structures, etc. that perform particular tasks or implement particular abstract data types. The sequence of instructions implemented in a particular data structure or program module represents examples of corresponding acts for implementing the functions or steps described herein.

Figure 2A:
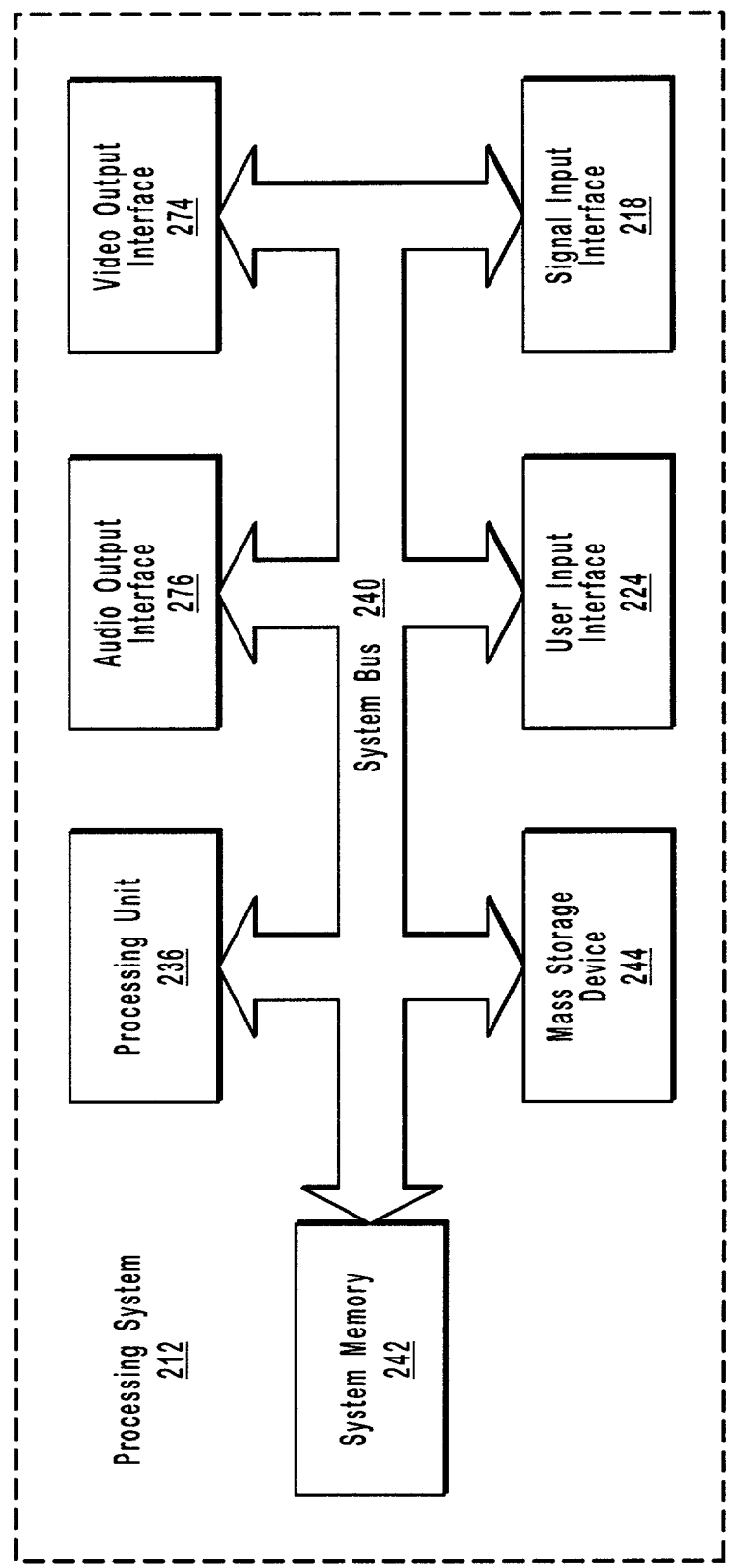
FIG. 2A illustrates an exemplary processing system that provides a suitable operating environment for the present invention.

FIG. 2A and the corresponding discussion are intended to provide a general description of a suitable environment in which the invention may be implemented. In the discussion, reference is made to a client system that may be used for displaying and/or recording programming. For purposes of this description and in the claims, a "client system" may be a processing system, such as a general or special purpose computer for performing the data processing steps disclosed herein and may include any number of interconnected consumer electronic devices. Examples of such consumer electronic devices include a video cassette recorder ("VCR"), a video game system, a stereo system, a television or monitor with data processing capabilities, a digital versatile disc system ("DVD"), a cable television box, a digital satellite system receiver ("DSS"), a terrestrial digital video broadcasting system ("DVB-T"), a cable digital video broadcasting system ("DVB-C"), or a satellite digital video broadcasting system ("DVB-S"). Examples of processing systems include a set-top box that serves as an Internet terminal, a cell phone, a personal digital assistant ("PDA"), a pager and any other device capable of processing data as described herein. Furthermore, the term "client system" is to be understood as a term that broadly describes a multimedia viewing environment, whether it is located in a viewer's home, at a place of business, in the public, or at any other location.

For purposes of this description and in the claims, the term "programming" is defined as including both the viewable portions of moving image data and its associated sound data and includes (but is not limited to) data in MPEG format. It may include data that is transmitted in conformance with Advanced Television Systems Committee ("ATSC") standards or in conformance with Association of Radio Industries and Business of Japan ("ARIB") standards.

For purposes of this description and in the claims, the term "multimedia content" is defined as including programming, as well as, any other combination of text, graphics, video, animation, or sound, and/or other media content that may be output in an integrated fashion.

In one embodiment, the present invention is implemented in a system that uses a conventional television screen or other display unit to display information and includes a set-top box or a similar Internet terminal that has been adapted to perform operations that include receiving and outputting multimedia content, composing, sending and receiving email, browsing the World Wide Web ("Web"), accessing other segments of the Internet, and otherwise displaying information. An Internet terminal typically uses standard telephone lines, Integrated Services Digital Network ("ISDN") lines, cable lines associated with cable television service, or the like, to connect to the Internet or other wide area networks. Embodiments of the present invention may utilize unidirectional "broadcast" type transport networking or bi-directional networking.

FIG. 2A illustrates a processing system 212. Processing system 212 may be a set-top box or Internet terminal that has been adapted to perform the operations disclosed herein. Processing system 212 may be integrally positioned with or separate from a display device, which may be a high definition television display, a standard television display, a flat panel display, a projection device, a high definition television display, a computer monitor, or any other device capable of displaying viewable video image data. Processing system 212 may also be integrally positioned with or separate from an audio system, which may be a speaker, a stereo system, or any device capable of emitting sound data.

Processing system 212 includes a signal input interface 218, which receives programming from an external signal source. Programming is transmitted from an external signal source to signal input 218 via a programming input line, which may be a cable or optic connection, a terrestrial antenna system, a satellite system, or any device or system capable of transmitting multimedia content to processing system 212. Although only one signal input interface is illustrated, processing system 212 may be configured with a plurality of signal input interfaces similar to signal input interface 218.

Processor system 212 also includes a user input interlace 224, which receives input from an input device such as a remote control, keyboard, microphone, or any other device capable of generating electronic instructions for processing system 212. An input device may be communicatively coupled to processing system 212 over an input link so as to enable such control. Input devices may generate electronic instructions over an input link in response to preprogrammed data or in response to a viewer pressing buttons on the input device.

Processing unit 236, which may execute computer-executable instructions implemented in software and/or hardwired logic circuitry, controls the operation of processing system 212. Processing unit 236 may execute computer-executable instructions designed to implement features of processing system 212, including features of the present invention. Processing unit 236 is coupled via system bus 240, which also interconnects various other system components, such as system memory 242, mass storage device 244, user input interface 224, and signal input 218. Instructions, data, and other software necessary for the operation of processing unit 236 may be stored in system memory 242, such as in read-only memory ("ROM") and/or in random-access memory ("RAM"), and/or in mass storage device 244. System memory 242 and mass storage device 244 are communicatively coupled to processing unit 236 so that processing unit 236 may read data from and may write data system memory 242 and mass storage device 244.

Mass storage device 244 may be a magnetic hard disk, a flash memory card, or any other magnetic or optical mass memory device that is capable of storing large amounts of data. Mass storage device 244 may also be used to record video data, in which case, processing system 212 functions as a digital video recorder.

In an embodiment where processing system 212 is associated with a multimedia transport system, processing system 212 communicates with a remote computer, such as a video on demand server, via a wide area network, a wireless link, or other means for establishing communications over a WAN that may be internal or external to processing system 212.

Referring now to signal input interface 218, if the signal on a programming input line includes multiple channels, a tuner included in signal input 218 tunes to a selected channel in the signal. Multiple tuners may be used to provide enhanced viewing features, such as picture-in-picture, recording one channel while viewing another, and recording a plurality of channels simultaneously. A signal decoder may be included in signal input interface 218, which decodes video data from a compressed video format (e.g. MPEG or MPEG-2) and performs the appropriate subsampling operations. In embodiments where the processing system 212 includes multiple tuners, processing system 212 may also include multiple signal decoders to perform decoding operations disclosed, which enable the image displayed on a display device to have a picture-in-picture, split-screen, or other multiple-window format.

Management system 212 may include video output interface 274, which includes a video encoder and/or a video converter. The video encoder assigns a code to frames of video data that are transmitted across a video image link and switches between analog and digital formats as necessary. Similarly, audio output interface 276 may include an audio converter to provide the necessary switching between analog and digital formats.

In this description and in the following claims, "data in an MPEG format" is defined as any data using any of the digital video compression standards or file formats developed by the Moving Pictures Expert Group ("MPEG"). This is defined as including any implementation utilizing MPEG-1, MPEG-2, MPEG-4, MPEG-7, or MPEG-21 in the transport, reception, transmission, input, or output of content.

In this description and in the following claims, a "media server" is defined as any computing device that may facilitate transportation of multimedia content.

In this description and in the following claims, "network connectable" is defined as being capable of being connected to a network. For example, a computer system may be capable of being connected to the Internet if the computer system includes a network adapter. However, this does not mean that the computer system is connected to the Internet, just that it may be connected to the Internet.

In this description and in the following claims, "operatively coupled" is defined as coupled in a manner that promotes the intended operation of a device. For example, a removable hard drive may be operatively coupled to a computer system, in which case the hard drive may operate to store data associated with the computer system. However, the hard drive may be included in the computer system but not operatively coupled to the computer system. This may result when the hard drive is removed from its connector but still physically resides in the computer system.

Figure 2B:
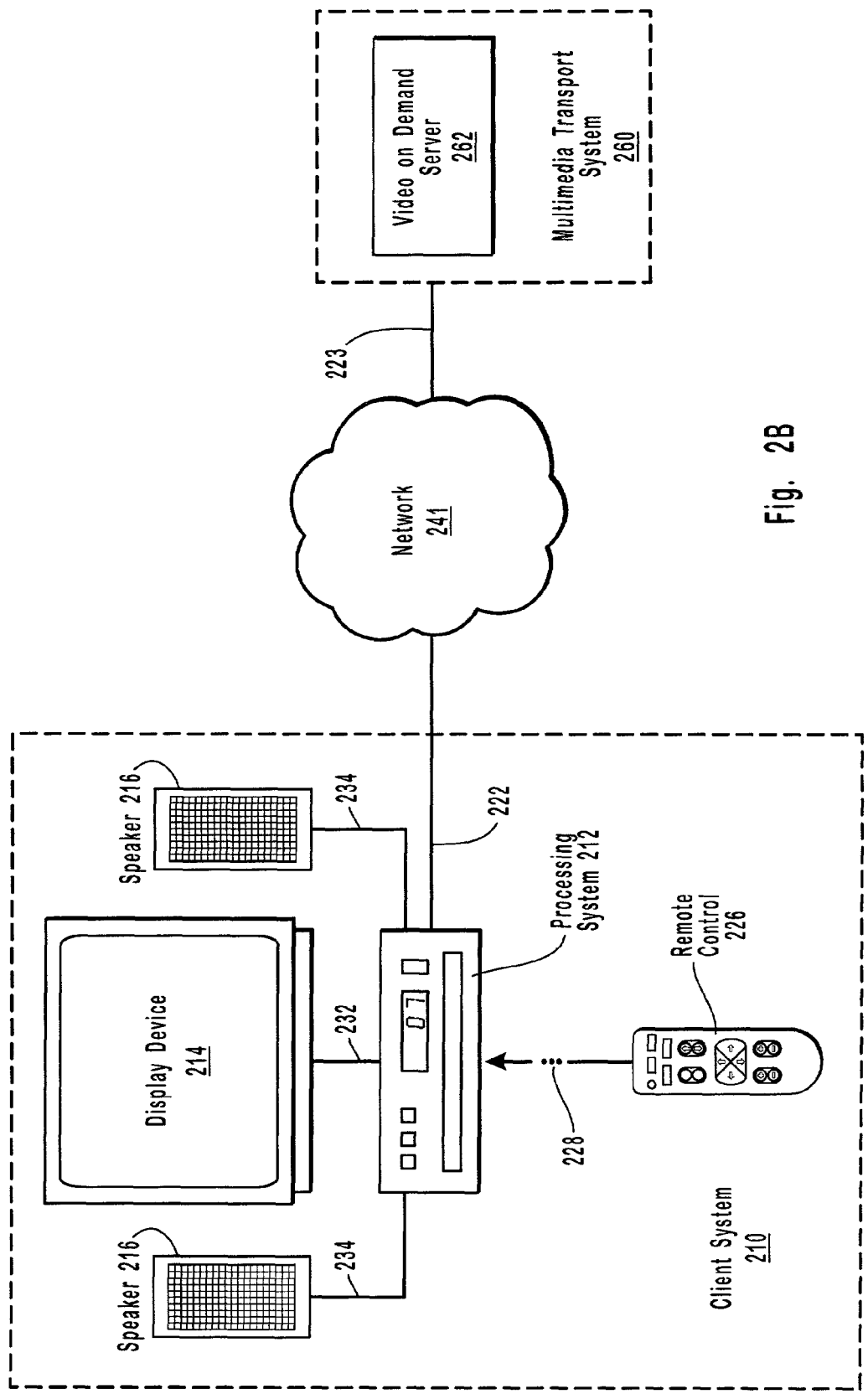
FIG. 2B illustrates an exemplary network system that provides a suitable operating environment for the present invention.

Referring to FIG. 2B, a client system 210 includes a processing system 212, a display device 214, speakers 216, and remote control 226. Signal input line 222 may be used to transport multimedia content to processing system 212. Also included in FIG. 2B is multimedia transport system 260. Multimedia transport system 260 includes video on demand server 262, which may transport multimedia content to processing system 212 or other devices included in network 241.

As illustrated in FIG. 2B, multimedia transport system 260 includes only one media server. It should be understood that the embodiment illustrated in FIG. 2B is merely an example. It would be obvious to those skilled in the art, after having reviewed this description, that the principles of the present invention may be implemented in an environment where multimedia transport system 260 includes varied types of media servers in varied quantities. Multimedia transport system 260 may also include other systems or components in addition to media servers. Such systems or components may monitor and control the resources of media servers or allocation of network bandwidth.

Network 241 may comprise a variety of network types, protocols, communication methods, or combinations thereof. It may include bi-directional network techniques, one way broadcast techniques, such as Internet Protocol ("IP") unicast or IP multi-cast, or combinations thereof. Modules included in network 241 may communicate in a manner where a module utilizes a first protocol to transmit data and the module utilizes a second protocol to receive data. It will be apparent to those skilled in the art, after having reviewed this description, that a variety of network types or combinations may be used to transport multimedia content to the client system.

Figure 3:
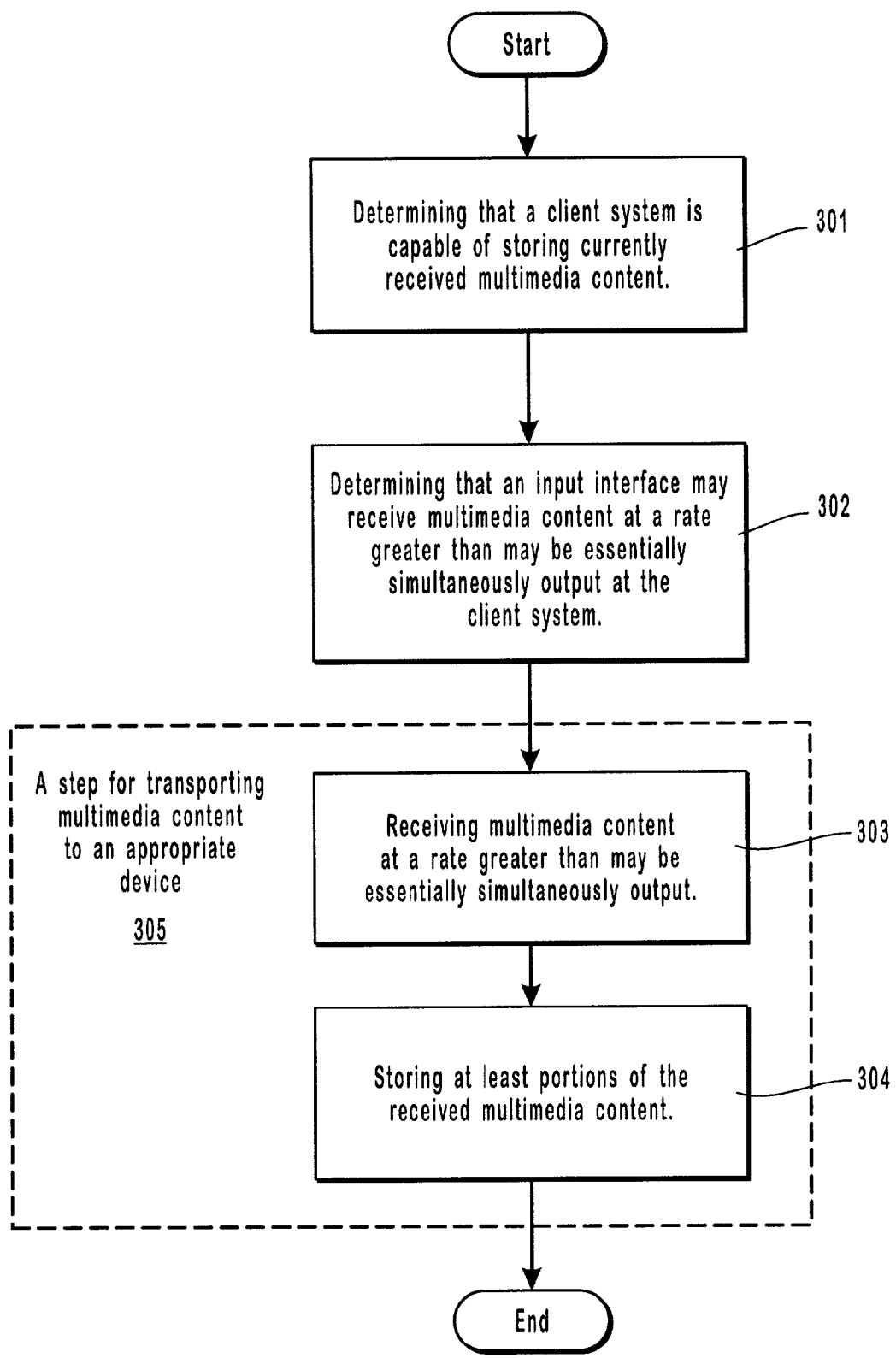
FIG. 3 is a flow diagram illustrating an example of a method for receiving multimedia content at a rate greater than a client system may essentially simultaneously output the multimedia content.

Illustrated in FIG. 3 is a method for receiving multimedia content at a rate faster than the multimedia content may be essentially simultaneously out put at a client. The method in FIG. 3 will be discussed with reference to the functional components included in FIGS. 2A and 2B.

The method illustrated in FIG. 3 may include an act of determining that a client system is capable of storing currently received multimedia content (act 301). This may include a client system performing a self-test to determine it's own capabilities. One example of this would be performing a test when a client system is powered on. A self-test may determine the components that are currently included in the client system, for example a hard disk or multiple signal input interfaces, as is known in the art. Performing a self-test at the time a client system is powered on is beneficial because some mass storage devices, such as removable hard disks or flash memory cards, may not always be operatively coupled to a client system.

If a client system is determined as including a hard disk or some other mass storage device, such as a flash memory card, the client system may be capable of storing received multimedia content. In some embodiments, a database of previously stored client system configurations may be accessed to determine the capabilities of a client. A multimedia transport system may or may not receive notification of a client system's capabilities.

The method in FIG. 3 may include an act determining that an input interface may receive multimedia content at a rate greater than may be essentially simultaneously output at the client system (act 302). This may include determining that an input interface, for example, signal input interface 218, includes a tuner that is capable of receiving multimedia content at a rate greater that may be simultaneously output at client system 210. This may mean that a tuner included in signal input interface 218 is capable of receiving multimedia content faster than audio output interface 276 and/or video output interface 274 are capable of outputting the multimedia content. Alternately, when viewing standard television programming, this may mean that a tuner included in signal input interface 218 is capable of receiving multimedia content faster than it would be output in a normal viewing environment.

In other embodiments, the determination in act 302 may include determining that an input interface, for example, signal input interface 218, includes multiple tuners. In multiple tuner embodiments it may be determined that each individual tuner is capable of receiving multimedia content at different rates. For example, one or more individual tuners may be capable of receiving multimedia content at a rate compatible with viewing television programming. Likewise, one or more individual tuners may be capable of receiving multimedia content at a rate greater that may be simultaneously output at client system 210.

Figure 5:
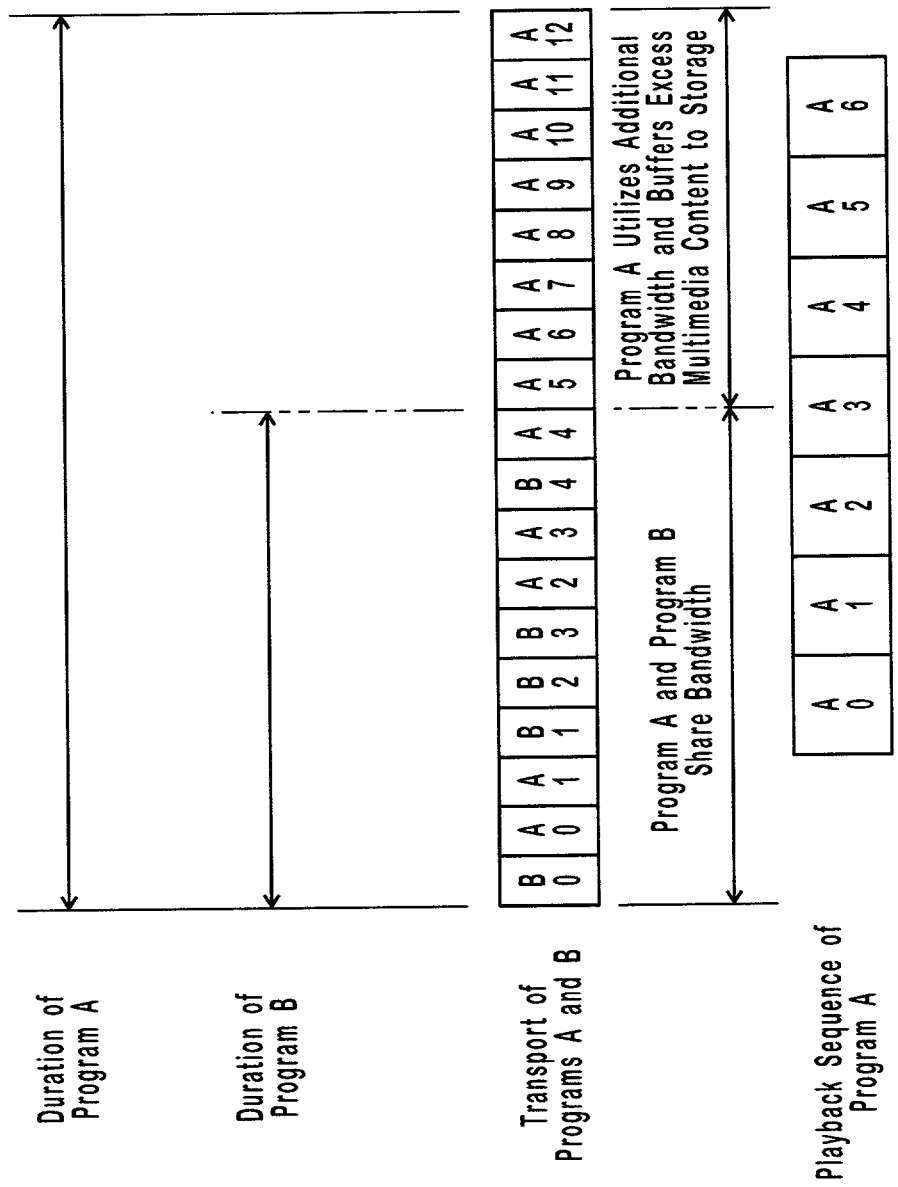
FIG. 5 illustrates an exemplary method for utilizing remaining bandwidth when input packets associated with a program utilize less bandwidth than is available.
Figure 6:
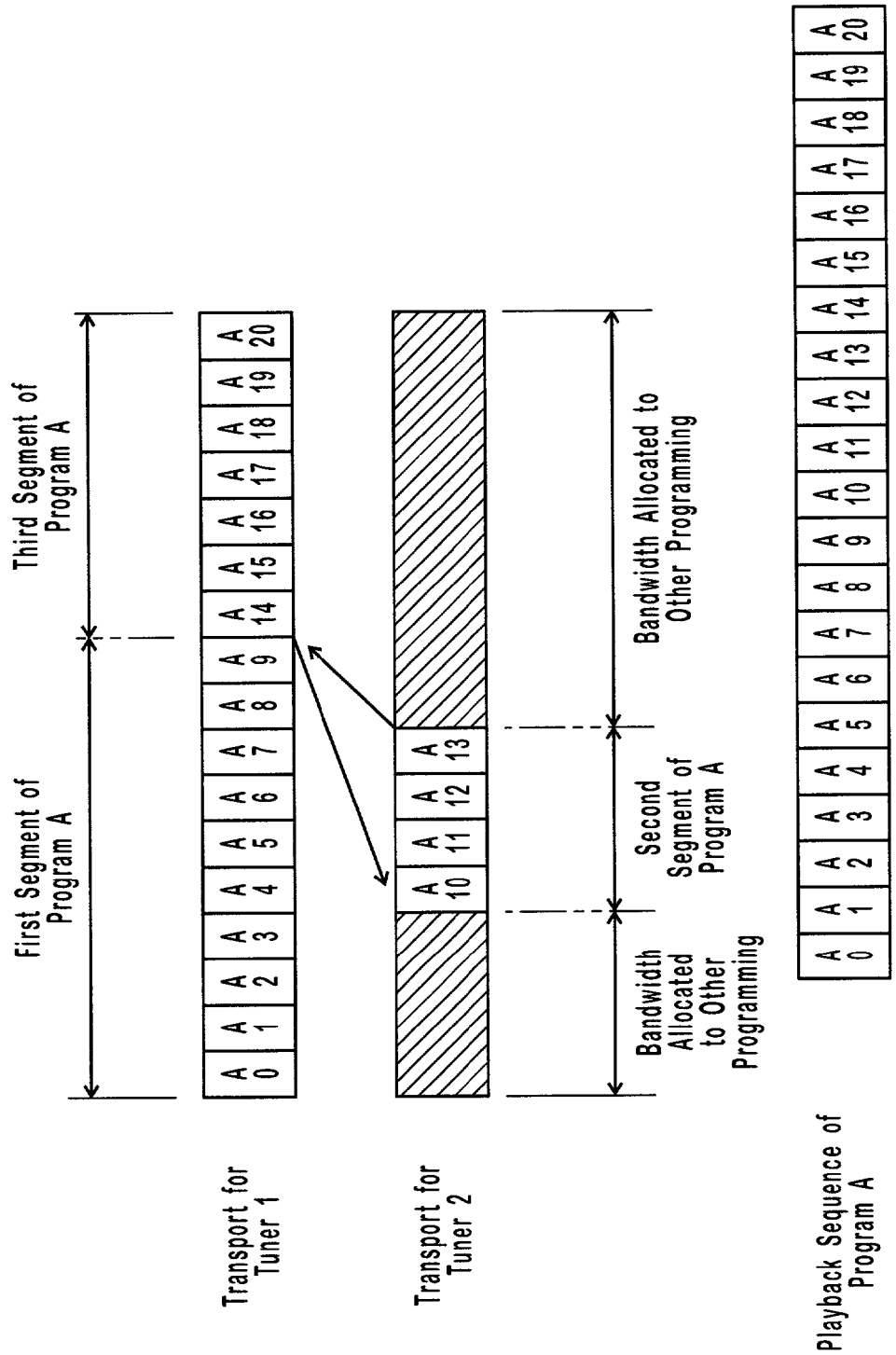
FIG. 6 illustrates an exemplary method for allocating bandwidth where multiple tuners may receive multimedia content.

In other embodiments, combinations of the capabilities discussed in FIGS. 5 and 6 may be determined. An input interface may include multiple tuners, each of which is capable of receiving multimedia content at a rate greater that the multimedia content may be simultaneously output at a client system. In these embodiments the time needed to complete the transport of multimedia content may be greatly reduced. For example, an input interface may include two tuners, each of which may receive multimedia content at a rate twice as great as multimedia content may be essentially simultaneously output. In this example, a multimedia delivery system may transport multimedia content to a client system at a rate four times greater than multimedia content may be simultaneously output. Thus, the multimedia content may be transported in one-fourth the time it may normally take.

Similar to determining if a client system includes the ability to store multimedia content, determining the capabilities of an input interface to receive multimedia content may be accessed from a database of previously stored client system configurations. Determining the capabilities of an input interface to receive multimedia content may also be facilitated by a client system performing a self test.

The method illustrated in FIG. 3 may also include a step for transporting received portions of multimedia content to an appropriate device (step 305). When multimedia content is received in excess of what may be simultaneously output, transporting multimedia content to an appropriate device promotes effective utilization of the resources of a client system.

Step 305 may include storing some portions of multimedia content while other portions of multimedia content are sent to output devices. For example, in FIG. 5, a tuner may be capable of receiving multimedia content at twice the rate multimedia content may be output at a client system. If portion A4 and A5 are received, portion A5 may be buffered to a storage device while portion A4 is output. Buffering some portions and outputting other portions may continue until all portions are output. While outputting portion A4, portions A6 and A7 may be received. Portions A6 and A7 may be buffered to a storage device, since the next portion to be output is A5. While outputting A5 portions A8 and A9 may be received, portions A8 and A9 may be buffered to a storage device since A6 is the next portion to be output. When portion A6 is output, portions A7, A8, and A9 may still be buffered to a storage device. Output of portions and buffering of portions may continue until transport of A12 is complete. Once, transport of A12 is complete, outputting portions may include retrieving buffered portions for a storage device and the bandwidth utilized to transport the portions may be reallocated for other purposes. Thus, receiving multimedia content at an increased rate more efficiently utilizes available network bandwidth and increases the chance of having sufficient bandwidth available during periods of increased network bandwidth usage.

In FIG. 6, portions A10, A11, A12, and A13 may be stored until portion A9 is output. Then, portions in the range from A14 to A20 may be stored until portion A13 is output. Thus, for some time, portions may be received from both tuner 1 and tuner 2. Some of the received portions are output and other portions are stored at a storage device. A maker may be associated with stored portions that indicates the time to playback a portion and points to the next portion to be played. For example, after playing portion A9 a marker may point to a location on a storage device where portion A10 is located. This is indicated by the arrow going from in between portions A9 and A14 to the beginning of portion A10. After playing portion A13, a marker may point to a location on a storage device where A14 is located. This is indicated by the arrow from the end of portion A13 to a point between portions A9 and A14. Thus, receiving portions of multimedia content from multiple tuners simultaneously decreases the amount of time needed to completely transport a program. This may increase the chance of having sufficient bandwidth available during periods of increased network bandwidth usage.

Markers may be used by a client to facilitate seamlessly playback a multimedia content where, some of the content is stored on a storage device while other content is currently being received. In FIG. 6, markers may be used to facilitate a playback sequence where portions A0 through A20 are output in a correct chronological sequence.

In some embodiments, step 305 may include an act of receiving multimedia content at a rate greater than may be simultaneously output (act 303) and storing at least portions of multimedia content (act 304).

Receiving multimedia content at a rate greater than may be simultaneously output (act 303) may include a tuner or non-tuner input receiving multimedia content at rate greater than may be essentially simultaneously output. For example, a tuner included in signal input interface 218 may have previously been determined to include this capability. Illustrated in FIG. 5, is an example of the transport of two programs, program A and program B, to a tuner with such capability.

Shown in FIG. 5 is the duration of program A and program B on the same transport. As illustrated, a first user may be watching a VOD program A while a separate VOD program B is being watched by a second user. During the transport of program B, program A and program B each utilize one-half of the available bandwidth. Each program receives a portion of the available bandwidth while both programs are being transported. Program A and Program B may have different data rates based on the compression rate and data formats associated with the programs. If transport of program B is paused or otherwise halted after transport of portion B4, portions of bandwidth previously allocated for transport of program B are reallocated for transport of program A. This is illustrated by the sequence A4, A5, A6, A7, A8, A9, A10, A11, A12. Thus, a multimedia delivery system will continue to utilize otherwise under utilized bandwidth to transport multimedia content to a client system.

As illustrated in FIG. 5, program A and program B each utilize one-half of the available bandwidth. It should be understood that this is only an example of how programs may share bandwidth. After reviewing this description, any number of methods for sharing bandwidth between programs would be apparent to one of ordinary skill in the art.

In other embodiments, receiving multimedia content at a rate greater than may be simultaneously output (act 303) may include receiving a plurality of streams of multimedia content. This may occur if it was determined that a signal input interface included multiple tuners. For example, a client system may be receiving multimedia content through multiple tuners included in signal input interface 218, but video output interface 274 and/or audio output interface 276 may only be capable of outputting one stream. It may also be that a client system includes one or more tuners and one or more non-tuner inputs or includes a plurality of non-tuner inputs. In embodiments where multimedia content is received at multiple input devices, whether they are tuners or non-tuner inputs, multimedia content may be received on different base frequencies. That is, a first program may be received at a first base frequency and a second program received at a second base frequency. A second input device may tune to the second base frequency and utilize unused bandwidth from unused program identifiers ("PIDs") within a different transport stream.

Illustrated in FIG. 6, is an example of transporting a program that utilizes two tuners, tuner 1 and tuner 2. During transport of program A, tuner 1 receives portions A0, A1, A2, and A3 while bandwidth for tuner 2 is allocated to other programming. Then tuner 1 receives portions A4, A5, A6, and A7, while tuner 2 receives portions A10, A11, A12 and A13. Tuner 1 then receives portions A8, A9, A14, A15, A16, A17, A18, A19 and A20 while bandwidth for tuner 2 is allocated to other programming. Since for some period of time multimedia content is received from both tuner 1 and tuner 2, multimedia content is received at a rate greater than may be simultaneously output.

Storing at least portions of multimedia content (act 304) may include storing multimedia in excess of what may be essentially simultaneously output. Such portions of multimedia content may be stored in any storage location associated with processing system 212. Storage locations may include mass storage device 244, system memory 242, a flash memory card, or any other location where data may be stored. Stored portions of multimedia content may be output after performance of a multimedia function is complete. Storing portions of multimedia content may include storing one or more video data, audio data and/or combinations of both, such as data in an MPEG format.

In FIG. 5, portions of program A, in excess of what may be essentially simultaneously output, may be buffered to a storage device. Storage of portions of program A may take place simultaneously with output of other portions of program A. Depending on the rate at which the tuner in FIG. 5 receives portions of program A, different quantities of portions may be stored during the output of another portion.

It may also be that a client system receives streams of multimedia content from a plurality of media servers. If each server in a plurality of servers is capable of transporting multimedia content, these servers may be utilized to increase the rate of delivery of multimedia content to a client system. If portions of a program are located at multiple media servers some portions may be transported from one media server and other portions from other media servers. Markers similar to those described in the discussion of FIG. 6 may be used to seamlessly playback received portions of multimedia content. It may be that media servers are located in different locations. For example, a client system may essentially simultaneously receive multimedia content from video on demand server 262 and another different media server that is not included in multimedia transport system 260.

In other embodiments, output of multimedia content may include modifying how a video output interface or an audio output interface currently processes data. This may include performing operations on a stream of multimedia content that includes video and/or audio data. For example, initiating a pause function while receiving a stream of data in an MPEG format may cause video output interface 274 and audio output interface 276 to temporarily stop processing. This may cause output of video data at display device 214 to be paused and output of audio data at speakers 216 to be muted. In one embodiment, video and/or audio data may be received from video on demand server 262.

It should be understood that data in an MPEG format is only one type of multimedia content that includes data representative of video and audio. It would be apparent to one skilled in the art, after having reviewed this description, that a wide variety of multimedia content formats may be used to implement the principles of the present invention.

Figure 4:
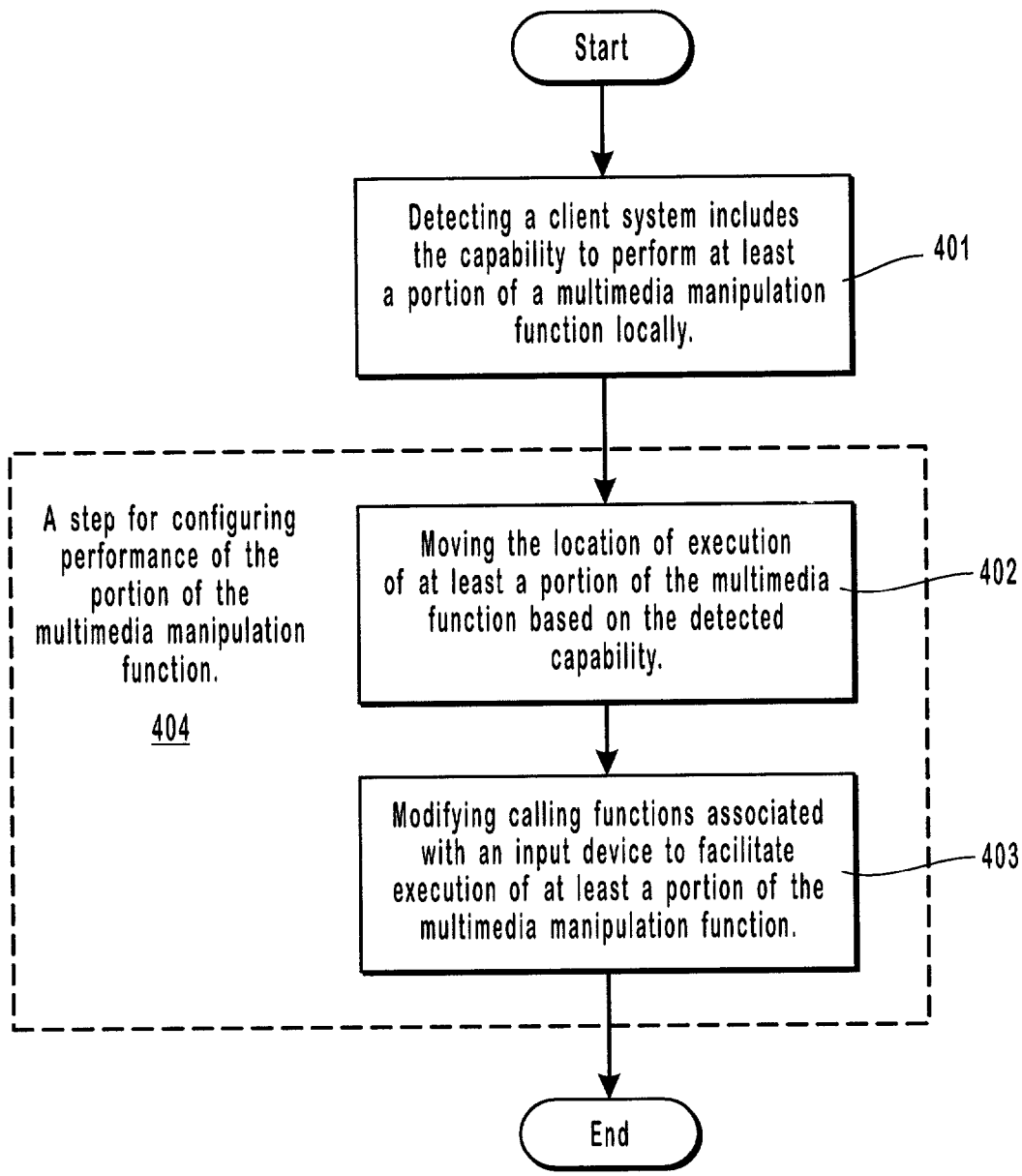
FIG. 4 is a flow diagram illustrating an example of a method for transferring the location of execution of a portion of a multimedia manipulation function.

Illustrated in FIG. 4 is a method for transferring the location of execution of a portion of a multimedia manipulation function. The method in FIG. 4 will be discussed with reference to the functional components included in FIGS. 2A and 2B.

The method in FIG. 4 may include detecting that a client system includes the capability to perform a portion of a multimedia manipulation function (act 401). This may include a client system performing a self-test to detect its own capabilities. One example of this would be performing a test when a client system is powered on. A self-test may detect the components that are currently included in the client system, for example, a hard disk, a flash memory cards, or multiple signal input interfaces. Performing a self-test at the time a client system is powered on is beneficial because some mass storage devices, such as removable hard disks or flash memory cards, may not always be operatively coupled to a client system. Detecting that a client system includes the capability to perform a portion of a multimedia manipulation function may include detecting the capabilities of a set-top box.

If a client system is detected as including a hard disk, some other mass storage device such as a flash memory card, multiple tuners, multiple signal input interfaces, or other components that may be utilized in performing a multimedia manipulation function, the client system may be capable of performing a portion of a VCR-like function. For example, if a client system includes a mass storage device, the client system may be capable of performing portions of a pause function. When this capability is executed locally at a client system, it may be executed without causing an interruption in the transmission of multimedia content received from a media server.

The method in FIG. 4 may include a step for configuring performance of a portion of multimedia manipulation function. Configuring performance of a multimedia manipulation function may promote balancing the execution of multimedia manipulation functions between a client system and a multimedia transport system. This may include an act of moving the location of execution of a portion of a multimedia manipulation function based on the detected capability (act 402) and modifying calling functions associated with an input device to facilitate execution of the portion of the multimedia manipulation function (act 403).

Moving the location of execution of a multimedia manipulation function (act 402) may include moving the location of execution from multimedia transport system 260 or video on demand server 262 to client system 210. This may include moving the location of execution of a portion of a VCR-like function, such as the pause function.

Moving the location of execution may also include moving executable instructions or a portion of a script to client system 210. Executable instructions include any file in a format that may be directly executed by a computer system such as client system 210. Executable instructions may also include any of the formats of program modules previously discussed. A script is defined as a macro, batch file, or other type of file that may include a list of commands that may be executed without user intervention. A script file may include reference to executable instructions previously included in a client system.

Modifying calling functions associated with an input device (act 403) may include modifying functions associated with the keys of a remote control or keyboard. That is, when a key included in a remote control or keyboard is activated, the underlying functions may be modified to call program modules or executable instructions included in a client system. This may include modifying calling functions to call program modules or executable instructions that were previously executed at multimedia transport system 260 of video on demand server 262.

Modification may also include modifying calling functions associated with initiation or performance of a VCR-like function. In one embodiment, client system 210 may be detected as including the capability to perform a pause function by using components solely included in client system 210. These components may include signal input interface 218 and mass storage device 244. Based on this detected capability, executable instructions, program modules, and/or portions of a script file may be transported to the client system and stored in system memory 242 or mass storage device 244. The location of execution of the pause function may be moved from multimedia system 260 to client system 210.

Calling functions associated with a pause key included in remote control 226 are modified. This modification includes the calling functions referencing executable instructions, program modules, and/or portions of scripts included in system memory 242 or mass storage device 244. Thus, when the pause key included in remote control 226 is activated, the pause function is performed by components included in client system 210. Multimedia transport system 260 and video on demand server 262 may be unaware that a pause function is being performed and may continue to transport multimedia content.

Modifying the behavior of a multimedia transport system in response to the capabilities of a client system is beneficial. Modified behavior may more fully utilize the capabilities of a client system and thus conserve the resources of a multimedia transport system or video on demand server. Modified behavior may also promote time-based load balancing. By transporting multimedia content at an increased rate when network bandwidth usage is low, additional bandwidth may be available when periods of higher usage occur. This reduces the chance that network bandwidth will continue to be allocated even though multimedia content is not being transported. Thus, by modifying the behavior of a multimedia transport system in response to detected client system capability, resources of all associated systems, as well as, network bandwidth are utilized in a more cost efficient manner.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired to be secured by United States Letters Patent is:

1. In a multimedia transport system that is network connectable to one or more client systems that may receive and output multimedia content, a method for modifying the behavior of the multimedia transport system by increasing the number of streams the multimedia content transported to a client system in order to provide load balancing when system bandwidth may be low, comprising:
    an act of detecting at a remote multimedia server that a client system includes the capability to simultaneously receive a plurality of multimedia content streams and store at least a portion thereof;
    based on the detection, the method further includes:
        an act of sending a first portion of multimedia content from the remote multimedia server in a first stream to the client system, the first stream being sent at a first carrier base frequency to be received at a first input device which receives the first base frequency; and
        an act of simultaneously sending with the first portion, a second portion of the same multimedia content in a second stream to the client system in order to facilitate sending the multimedia content in less time so as to free up bandwidth sooner, the second stream being sent at a second carrier base frequency to be received at a second input device which receives the second base frequency.

2. The method of claim 1, wherein the client system comprises a plurality of tuners configured to receive the first and second streams of the same multimedia content.

3. The method of claim 2, wherein at least one of the plurality of tuners is configured to receive the first, second, or both streams of the same multimedia content at a higher rate than the client system may simultaneously output.

4. The method of claim 1, wherein the client system comprises at least one tuner configured to receive the first stream and at least one non-tuner configured to receive the second stream.

5. The method of claim 4, wherein the at least one non-tuner is one or more of an interface card, a cable modem, a DSL modem, a standard telephone modem, a satellite receiver.

6. The method of claim 5, wherein the at least one non-tuners is configured to receive the first, second, or both streams of the same multimedia content at a higher rate than the client system may simultaneously output.

7. The method of claim 1, wherein the client system comprises a plurality of non-tuners configured to receive the first and second streams of the same multimedia content.

8. The method of claim 7, wherein the at least one non-tuner is one or more of an interface card, a cable modem, a DSL modem, a standard telephone modem, a satellite receiver.

9. The method of claim 8, wherein the at least one non-tuners is configured to receive the first, second, or both streams of the same multimedia content at a higher rate than the client system may simultaneously output.

10. The method of claim 1, wherein the client system comprises:
at least one tuner configured to receive the first, second, or both streams,
at least one non-tuner for receiving the first, second, or both streams, or both.

11. The method of claim 1, wherein the second stream is sent using a remote server different from the remote multimedia content server that sent the first stream.

12. In a multimedia transport system that is network connectable to one or more client systems that may receive and output multimedia content, a method for modifying the behavior of the multimedia transport system by increasing the number of streams of the multimedia content transported to a client system in order to provide load balancing when system bandwidth may be low, comprising:
an act of sending an indication to a remote multimedia server that a client system includes the capability to simultaneously receive a plurality of multimedia content streams and store at least a portion thereof;
based on the indication, the method further includes:
an act of receiving a first portion of multimedia content from the remote multimedia server in a first stream at the client system, the first stream being received at a first carrier base frequency to be received at a first input device which receives the first base frequency; and
an act of simultaneously receiving with the first portion, a second portion of the same multimedia content in a second stream at the client system in order to facilitate sending the multimedia content in less time so as to free up bandwidth sooner, the second stream being received at a second carrier base frequency to be received at a second input device which receives the second base frequency.

13. The method of claim 12, wherein the client system comprises a plurality of tuners configured to receive the first and second streams of the same multimedia content.

14. The method of claim 13, wherein at least one of the plurality of tuners is configured to receive the first, second, or both streams of the same multimedia content at a higher rate than the client system may simultaneously output.

15. The method of claim 12, wherein the client system comprises at least one tuner configured to receive the first stream and at least one non-tuner configured to receive the second stream.

16. The method of claim 15, wherein the at least one non-tuner is one or more of an interface card, a cable modem, a DSL modem, a standard telephone modem, a satellite receiver.

17. The method of claim 16, wherein the at least one non-tuners is configured to receive the first, second, or both streams of the same multimedia content at a higher rate than the client system may simultaneously output.

18. The method of claim 12, wherein the client system comprises a plurality of non-tuners configured to receive the first and second streams of the same multimedia content.

19. The method of claim 18, wherein the at least one non-tuner is one or more of an interface card, a cable modem, a DSL modem, a standard telephone modem, a satellite receiver.

20. The method of claim 19, wherein the at least one non-tuners is configured to receive the first, second, or both streams of the same multimedia content at a higher rate than the client system may simultaneously output.

21. The method of claim 12, wherein the client system comprises:
at least one tuner configured to receive the first, second, or both streams,
at least one non-tuner for receiving the first, second, or both streams, or both.

22. The method of claim 12, wherein the second stream is received using a remote server different from the remote multimedia content server that sent the first stream.

23. The method of claim 12, further comprising:
automatically consuming the first stream at the client system such that the first portion of the multimedia content is played; and
storing the second steam for subsequent playing of the second portion of the multimedia content.

* * * * *